United States Patent [19]

Pinckley et al.

[11] 4,363,262

[45] Dec. 14, 1982

[54] APPARATUS FOR STORAGE AND DISPENSING COFFEE

[76] Inventors: Marion E. Pinckley, 801 E. Jefferson St., Louisville, Ky. 40206; William G. Carlin, 1617 Speed Ave., Louisville, Ky. 40205

[21] Appl. No.: 198,170

[22] Filed: Oct. 17, 1980

[51] Int. Cl.³ .............................................. A47J 31/00
[52] U.S. Cl. .................................. 99/290; 220/85 B; 220/93; 222/95
[58] Field of Search .............. 99/279, 290, 286, 293, 99/294, 295, 297, 298; 222/95, 96, 386.5; 220/93, 85 B

[56] References Cited

U.S. PATENT DOCUMENTS

| | | | |
|---|---|---|---|
| 1,773,529 | 8/1930 | Gilmore | 220/93 |
| 2,626,558 | 1/1953 | Stein | 99/290 |
| 3,578,467 | 5/1971 | Huber | 220/93 |
| 3,931,834 | 1/1976 | Caillet | 222/386.5 |
| 4,135,635 | 1/1979 | Fujii | 220/85 B |
| 4,213,545 | 7/1980 | Thompson | 220/85 B |

*Primary Examiner*—Robert W. Jenkins
*Attorney, Agent, or Firm*—William R. Price

[57] ABSTRACT

A method and apparatus for brewing, dispensing and storing coffee involves the use of a movable liquid-gas separation member floatingly mounted on the top level of the brewed coffee so as to exclude air therefrom. The liquid-gas separation member is mounted so as to separate the storage container into a liquid containing portion and a gas containing portion. A vent from the gas containing portion of the container allows for the passage of air into and out of the container as coffee is introduced into the container or is withdrawn therefrom. By this method, the coffee can be stored for long periods of time at serving temperature without developing an acrid or strong, objectionable taste.

13 Claims, 6 Drawing Figures

APPARATUS FOR STORAGE AND DISPENSING COFFEE

BACKGROUND OF THE INVENTION

This invention relates generally to the method of brewing, storing and dispensing coffee so as to effect the preservation thereof and to a means and method for handling and dispensing such a preserved product.

It is well known that brewed coffee has limited keeping qualities. Of particular damage to the flavor of brewed coffee is the act of brewing the coffee and allowing it to cool and subsequently heating it before use. As a consequence, most commercial users will not keep liquid coffee over one hour due to the rapid deterioration of its taste. Consequently, many commercial users and fine restaurants throw away a huge amount of liquid coffee because of the rapid deterioration. This, of course, is quite a large expenditure.

DESCRIPTION OF THE PRIOR ART

The literature states that deterioration of the coffee is caused by the oxidation of the coffee and concomitant deterioration or degradation of the coffee oils. Heat, of course, accelerates the oxidation and the vaporization process concentrates the existing coffee so that a stale or strong taste develops in a very short time. Most restaurants, known for their good coffee, serve a very strong, potent brew. These brews are especially susceptible to deterioration and a strong, acrid taste. Many proposals have been made for preserving coffee over a long period of time. Insofar as we are aware, however, none of these proposals have achieved any great commercial acceptance. A survey showed that the top three coffee equipment suppliers were not using and were not aware of any users of equipment proposed under various previously issued patents whose purpose was to reduce or arrest the oxidation process. According to the patent literature, Fisher, in U.S. Pat. No. 2,230,031, proposed deaerating the water prior to percolation, brewing the coffee with the deaerated water and filling a container with the brewed coffee, sealing same and sterilizing the containers. Baselt, in U.S. Pat. No. 2,291,604 proposed the step of vacuumizing the filtered coffee to remove oxygen therefrom and thereafter hermetically sealing the treated coffee in the absence of air and heating the sealed package to sterilize same.

Heyman, in U.S. Pat. No. 2,620,276, claimed that the undesirable flavor develops when ground coffee is allowed to stand. Therefore, he proposed placing coffee beans (or coffee ground very coarse) into containers while hot from roasting, and adding hot water thereto and sealing and sterilizing the coffee beans in the can.

J. R. Stein, in U.S. Pat. No. 2,626,558, proposed the step of filtering the brewed coffee and thereafter introducing an anti-oxidizing agent into the brew prior to placing the composition into a hermetically sealed container. In U.S. Pat. No. 2,497,721, Foulkes proposed the addition of sodium phosphite or propylene glycol to the brewed coffee, and thereafter hermetically sealing same. Cornelius, in U.S. Pat. No. 3,261,507 and Austin and Cornealius, in U.S. Pat. No. 3,582,351, proposed the step of pushing the brewed coffee from a container by the use of carbon dioxide, thereafter subjecting the coffee in a carbonating container under pressure to carbon dioxide to carbonate same, and thereafter flashing the carbonated coffee to remove the carbon dioxide by removal of the pressure and by addition of hot water to produce a preserved coffee.

SUMMARY OF THE INVENTION

According to this invention, the coffee is brewed in any normal way. Thereafter, the brewed coffee engages a movable liquid-gas separation member in a container so that the liquid interface with the liquid-gas separation member effectively shields the level of liquid in the container from air or oxygen. This is effected by allowing air or other gas to enter the container as the coffee is evacuated, and by evacuating the air or other gas from the container as coffee is introduced into the container. In this method, therefore, the coffee may be maintained at room temperature or at serving temperature and be piped to dispensing stations located at some distance away. Thus, in a large restaurant, the coffee can be served at serving temperature from a batch made up daily. Additionally, according to this invention, the same proposal can be used for the normal coffee serving pot, equipped with a specially designed liquid-gas separation device so that air and oxygen are kept out of contact with the coffee in the pot while allowing the coffee to be dispensed therefrom without contamination from air.

DESCRIPTION OF THE PREFERRED EMBODIMENT

Figure 1:
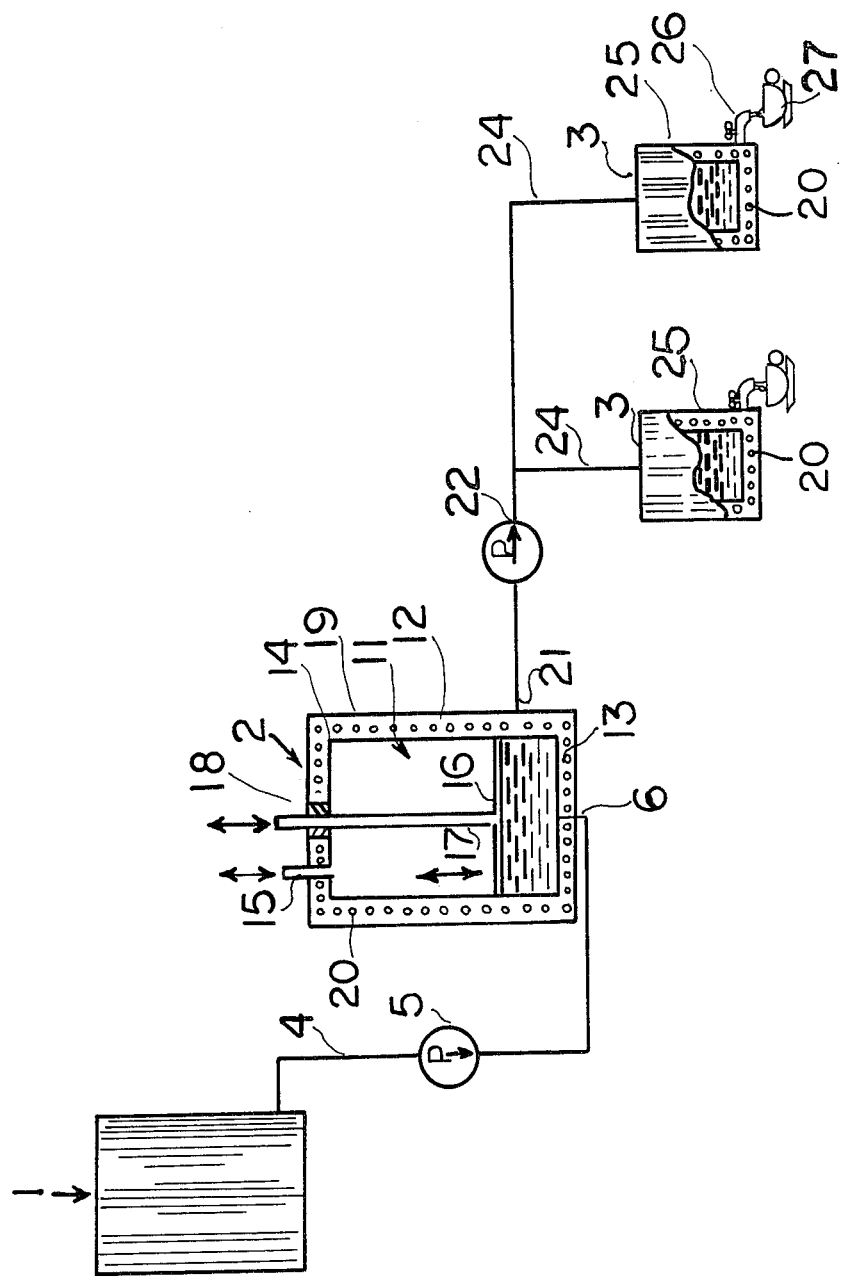
FIG. 1 is a diagrammatic view with parts in section, illustrating the process and apparatus of this invention as a unitary system for a large restaurant, hospital or other institution.

Referring now to FIG. 1, the invention is shown as a unitary system. Referring to the drawing, a coffee brewing station 1 is shown which can operate by any conventional method of making large amounts of coffee. The coffee brewed in station 1 is piped through pipe 4 through the provision of pump 5 to the coffee storage station 2, and is piped from there to the serving station 3 via lines 21, through pump 22 and lines 24. The pump 22 may not be required, however, if the device is utilized in a multi-story building, the pump can be utilized to transfer the coffee from a lower floor to the upper floors for service at the serving station 3.

As will be appreciated, the heart of the invention is the storage of the brewed coffee under conditions that the flavor and aroma are not degraded. This is accomplished by means of a liquid-gas separating member 16 which, according to FIG. 1, is in the form of a circular, flat piston head 16, which fits closely against the straight walls 12 of container 11. When the container 11 is in empty condition, the piston member rests directly against the bottom 13 of the container and when it is in absolutely full condition, the piston 16 rests against the top 14 of the container. Coffee from the brewing station 1 is pumped through line 4 via pump 5 through coffee inlet 6, thus forcing the piston member 16 upwardly in the direction shown. The piston head forming the liquid-gas separation member 16 has connected thereto a piston rod 17 which slides in annular bearing 18 located in the top 14 of container 11. Also located in the top is a vent 15 through which the air is evacuated from the container as the coffee is pumped therein and which allows air to pass from the outside back into the container as coffee is withdrawn through line 21 to the service station 3. By this method, the air is completely eliminated from contact with the stored coffee and we have found that under these conditions the coffee can be stored for many hours or indeed several days without losing its desirable flavor.

As is shown in the drawings, the container 11 may be insulated as designed by numeral 19 and may be equipped with heating coils 20 of suitable type to keep the coffee 7 in the container at serving temperature. Furthermore, as is known, the containers 25 at the serving station 3 may also be insulated and optionally equipped with heating apparatus, all thermostatically controlled so that the coffee at the serving station 3 is at proper serving temperature. As is illustrated, the coffee from the containers 25 at the serving station can be dispensed through spigots 26 into cup and saucers 27.

The advantages of this system is the elimination of wasted coffee due to deterioration. The prior art is replete with examples of how coffee becomes degraded through oxidation and heat through the breakdown of the essential oils forming the flavorful portion of the coffee brew. However, insofar as we are aware, no one has yet proposed a method which has been accepted commercially in restaurants, hospitals, schools and the like whereby coffee can be maintained for long periods. As a matter of practice, many fine restaurants will not hold the coffee for more than one hour due to the acrid and strong flavor and aroma that ensues from keeping it heated in open containers. Furthermore, an even more disagreeable taste is encountered when the coffee is allowed to cool and is then reheated. Accordingly, many institutions and restaurants waste a huge amount of coffee due to improper or unsatisfactory storage conditions. What happens as a matter of practice, is that any coffee not consumed within a relatively short time is actually discarded.

Figure 2:
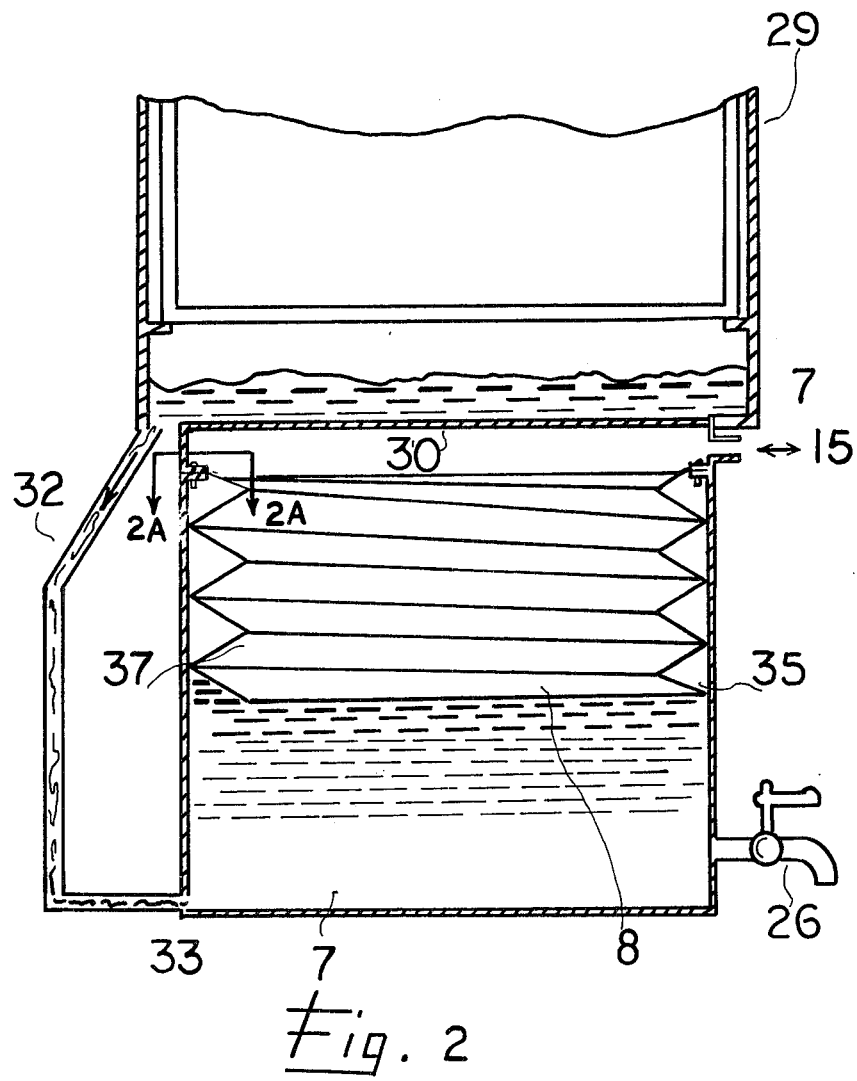
FIG. 2 is a fragmentary view with parts in section, illustrating a modified coffee urn according to the present invention.
Figure 2A:
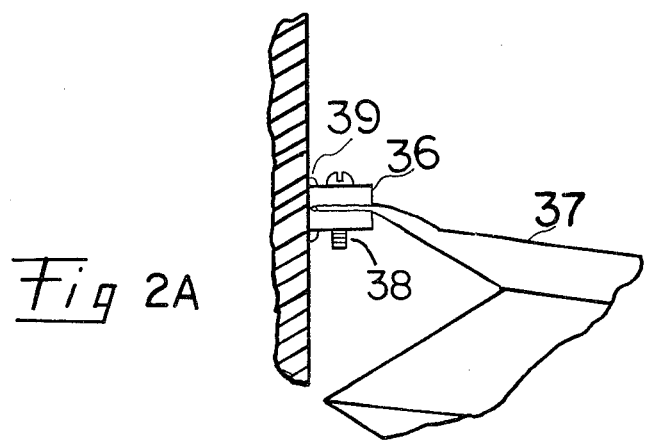
FIG. 2A is a sectional view, enlarged for purposes of illustration, and taken along lines 2—2, illustrating the bracket utilized to secure the diaphragm in position.
Figure 3:
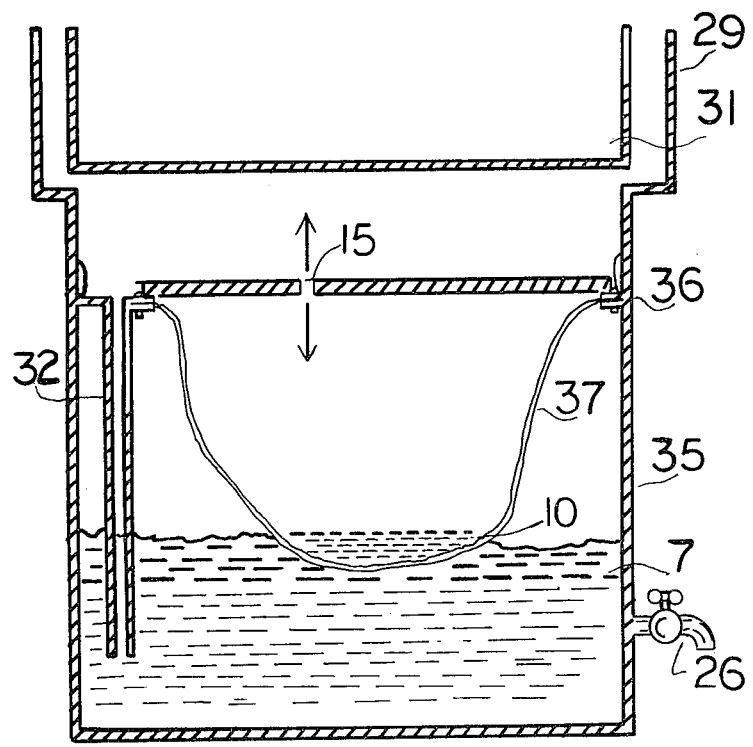
FIG. 3 is a fragmentary sectional view illustrating still another embodiment of this invention.

The invention has been designed also for use with a modified coffee urn. These modifications are shown in FIGS. 2 and 3 in which the walls of the coffee urn are indicated as 29 and the filter basket containing the coffee grounds are at 31. The coffee is made in the normal way so that there is a coffee level normally above partition 30 separating the conventional coffee urn from the storage container 35 of this invention. Again, the coffee container has straight walls, however, there is interposed between the partition 30 a loosely held accordian or bladder-type diaphragm 37 grasped along the edge 36. As best shown in FIG. 2A, the diaphragm is held in bracket 37 by bolt 38. The bracket is welded at point 39 to the container 35.

The coffee from the urn is transferred by liquid conduit 32 to the inlet 33 at the bottom of the container 35. Thus, the coffee pushes the accordian-type diaphragm 37 upwardly and the air between the partition and the upper portion of the accordian-type diaphragm are evacuated through the vent 15. Again, the coffee is dispensed through standard spigot 26 so that air can enter through vent 15 to compensate for the coffee 7 withdrawn. The liquid diaphragm interface is indicated at 8.

The modification shown in FIG. 3 is essentially identical except that the liquid conduit 32 is located within the walls of container 35 and the vent 15 is located in the partition 30 separating the urn proper from the storage portion. The diaphragm bracket 36 is shown resting below the partition 30. A level of water 10 is shown above the bottom of the diaphragm 16. The water may be introduced through vent 15. This water level appears to hold the heat and prevent condensation of the coffee vapors on the other side of the diaphragm 16.

Figure 4:
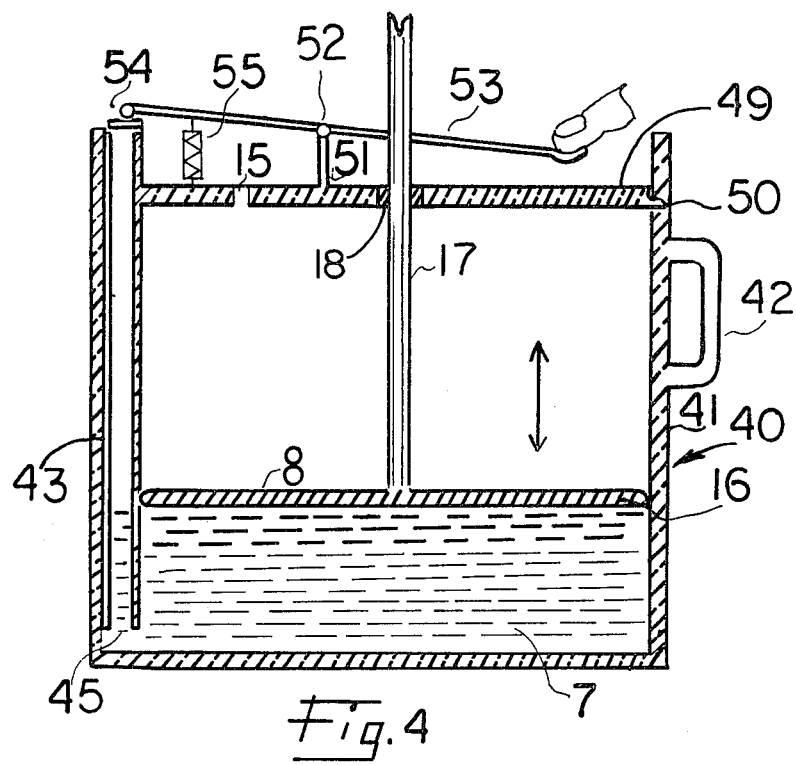
FIG. 4 is a side elevational view illustrating a coffee pot made according to the present invention.

The invention has also been designed to be used in the smaller restaurants with the standard coffee makers (See FIG. 4). Coffee, as is well known, is made through the normal coffee maker and fills the serving pot 40. The coffee pot 40 is allowed to fill in the normal way and thereafter the top 49 is fitted into the opening of the coffee pot and is engaged as illustrated in FIG. 4 by a lug or rough thread connection 50.

As is illustrated in FIG. 4, the liquid-gas separating member 16 in this case is in the form of a cylindrical piston 16, which floats along the wall 41 of the container. The piston is guided by means of piston rod 17 trained through annular bearing 18 in the top 49 of the container. The piston is also trained around dip pipe 43 which acts as a guide for the piston. Thus, when the operator places the top 49 including a dip pipe 43 into a full pot of coffee, the liquid-solid interface 8 between the coffee and the liquid-gas separation means 16 immediately eliminates by way of dip pipe 43 all the air from the container. As the coffee is served, through dip pipe 43, the air enters through vent 15 in the top 49 of the closure member thus allowing the piston 17 to move downwardly in the container.

This coffee pot, with the handle 42, contains a lever-type pour control member 54 which closes the open portion of dip pipe 43. The lever 53 is supported on fulcrum post 51 and fulcrums at 52 upon application of thumb or finger pressure against the pressure of spring 55, as indicated. The coffee then is poured through the dip pipe 43 with the pour control member 54 open. Merely closing the pour control member 54 will keep the coffee level in the dip pipe 43 at the top even though the liquid-solid interface 8 is much lower as is shown in FIG. 4.

Figure 5:
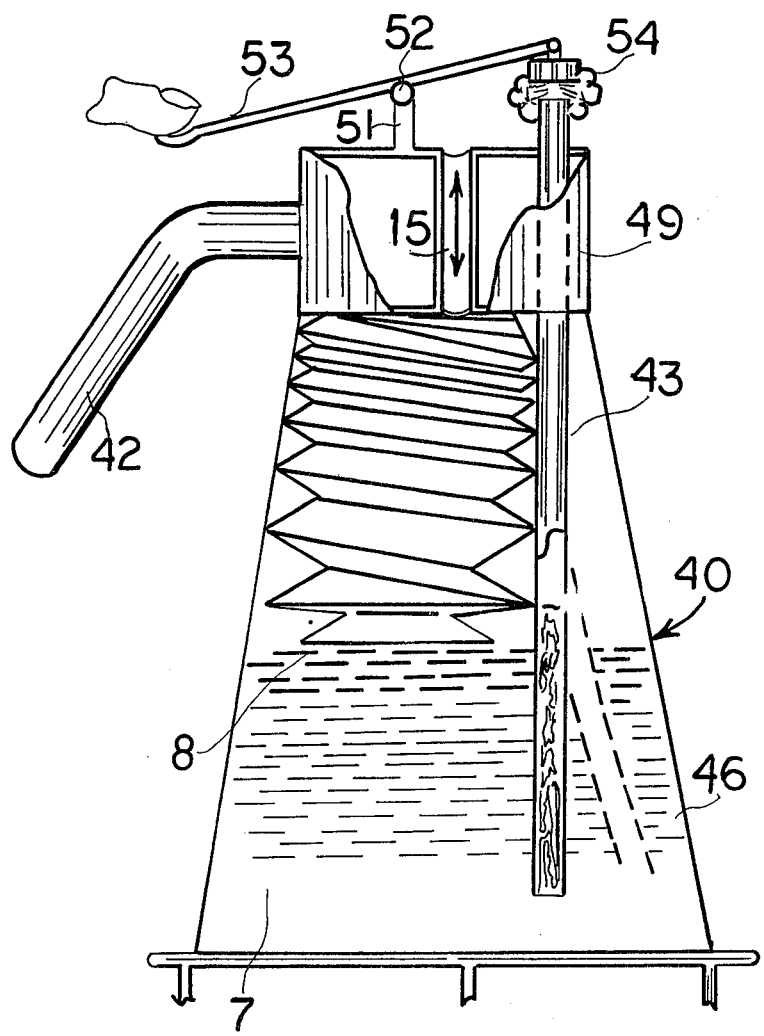
FIG. 5 is a side elevation with parts in section of still another manually-handled coffee pot made according to the principles of this invention.

Essentially the same apparatus is disclosed in FIG. 5 except that the walls are tapered as illustrated at 46 and a bellows or bladder-type, flexible diaphragm 16 is utilized. Again, however, the accordian diaphragm 16 floats, forming a solid-liquid interface at 8 between the coffee and the bottom of the diaphragm. Water can be introduced into the diaphragm 16 through vent 15. Thus, there is a water level (not shown) above the top surface of the diaphragm. This water level tends to absorb and store heat and therefore tends to prevent condensation of the water vapors on the other side of the diaphragm. It is believed that condensation of the coffee vapors tends to degrade the flavor of the coffee. Furthermore, air is allowed to enter through vent 15 as coffee is dispensed from the apparatus.

Many modifications can occur to those skilled in the art from the detailed description hereinabove given and such is meant to be exemplary in nature and nonlimiting except so as to be commensurate in scope with the appended claims.

We claim:

1. A storage receptacle for brewed coffee, which comprises:
   A. a container;
   B. means for introducing coffee into said container in which said means for introducing coffee into said container is an inlet at the bottom of said container;
   C. a movable liquid-gas separating member adapted to variably separate said container between an upper gas containing portion and a lower liquid containing portion and which floats vertically on the top of the coffee in said container responsive to the liquid level therein;
      1. said movable liquid-gas separating member being in the form of a flat piston head, conforming to the shape of said container and slideably mounted in close engagement with the walls of said container and which is raised vertically by the introduction of brewed coffee into said inlet on the bottom of said container;
   D. vent means for allowing the passage of air in and out of said container;
   E. outlet means for withdrawing coffee from said container;
   F. the further combination therewith of a pipe operatively connected with the coffee inlet in the bottom of the container and a pump in operative relation therewith for pumping the coffee, under pressure, into said container.

2. A storage receptacle, as defined in claim 1, the further combination therewith of:
   A. a closure member for closing the top of said container;
   B. an annular bearing means in the top of said closure member;
   C. a piston rod connected to the top of said flat piston head and trained through said annular bearing means in the top closure member, for guiding the piston rod and piston head assembly.

3. A storage receptacle which comprises:
   A. a container in the form of a coffee urn;
   B. means for introducing coffee into said container;
   C. a movable liquid-gas separating member adapted to variably separate said container between an upper gas containing portion and a lower liquid containing portion and which floats vertically on the top of the coffee in said container responsive to the liquid level therein;
   D. vent means for allowing the passage of air in and out of said container and;
   E. outlet means for withdrawing coffee from said container;
   F. said storage receptacle forming the bottom portion of said coffee urn and which comprises:
      1. a partition closing the upper part of said receptacle and which separates said bottom portion from said urn;
      2. a liquid conduit in communication with said urn and said bottom portion of said container.

4. A storage receptacle for brewed coffee, which comprises:
   A. a container in the form of a standard coffee pot, adapted to receive the coffee from a commercial coffee maker;
   B. a closure member which fits onto the neck of said coffee pot, and which comprises:
      1. a movable liquid-gas separating member in the form of a flexible diaphragm, floatingly disposed on the top of said coffee to variably separate said container between an upper gas containing portion and a lower liquid containing portion and which moves vertically on top of the coffee in said pot responsive to the liquid level therein;
      2. vent means located at the top of said closure member and in communication with said flexible diaphragm;
   C. outlet means for withdrawing coffee from said container.

5. A coffee storage receptacle, for brewed coffee, as defined in claim 4, in which said outlet means is in the form of a dip pipe, extending from near the bottom of said container through said closure member.

6. A coffee storage receptacle, as defined in claim 5, the further combination with said dip pipe of a manually-operated pour control member mounted for movement between open and closed position.

7. A coffee storage receptacle, as defined in claim 6, in which said manually-operated pour control member is spring loaded so as to hold said closure member in normally closed position.

8. A coffee dispensing system, which comprises in combination:
   A. a coffee brewing station;
   B. a coffee storage receptacle in the form of a closed container and having a movable liquid-gas separation member mounted therein;
   C. a coffee dispensing station;
   D. conduit for transporting coffee from said coffee station to said coffee storage receptacle;
   E. conduit for transporting coffee from the bottom of said storage receptacle to said coffee dispensing stations;
   F. said liquid-gas separation member being floatingly disposed on the top of the level of brewed coffee in said container and vertically movable with the level of brewed coffee therein; and
   G. vent means being located in the top of said container for the passage of air into and out of said storage receptacle upon the introduction and withdrawing of coffee therefrom.

9. A coffee dispensing system, as defined in claim 8, in which said movable liquid-gas separating member is in the form of a flat piston head having a shape conforming with the shape of said container and mounted for vertical movement from the bottom of said empty container to the top of said full container through the floating engagement with the top of the coffee within said container.

10. A coffee dispensing system, as defined in claim 9, the further improvement therewith of a pump mounted in the conduit connecting the coffee brewing station and the coffee storage receptacle.

11. A coffee dispensing system, as defined in claim 8, in which said liquid-gas separation member is in the form of a bladder-type, flexible diaphragm.

12. A coffee dispensing system, as defined in claim 8, the further combination therewith of heating means for holding the coffee within said coffee storage receptacle at serving temperature.

13. A coffee dispensing system, as defined in claim 8, which includes a liquid water level maintained above the liquid-gas separation means for storing heat in the system and preventing the condensation of coffee vapors.

* * * * *

UNITED STATES PATENT OFFICE
CERTIFICATE OF CORRECTION

Patent No. 4,363,262          Dated Dec. 14, 1982

Inventor(s) Marion Pinckley and William G. Carlin

It is certified that error appears in the above-identified patent and that said Letters Patent are hereby corrected as shown below:

Col. 3, line 19

Strike "designed" and substitute therefor --designated--

Signed and Sealed this

Second Day of August 1983

[SEAL]

Attest:

GERALD J. MOSSINGHOFF

Attesting Officer        Commissioner of Patents and Trademarks